No. 815,295. PATENTED MAR. 13, 1906.
B. HOLT.
WHEEL.
APPLICATION FILED DEC. 13, 1904.
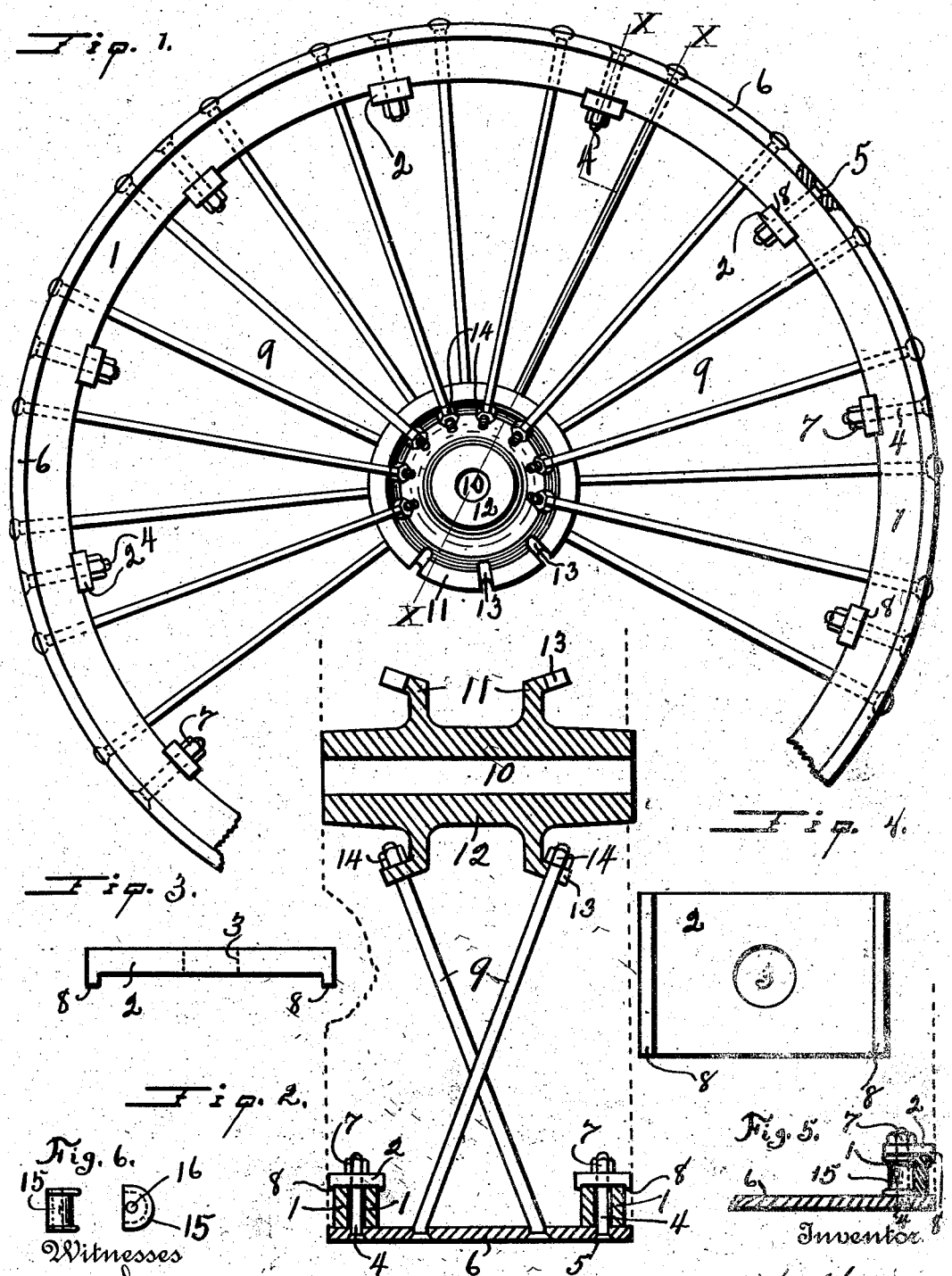

UNITED STATES PATENT OFFICE.

BENJAMIN HOLT, OF STOCKTON, CALIFORNIA.

WHEEL.

No. 815,295.　　　　Specification of Letters Patent.　　　Patented March 13, 1906.

Application filed December 13, 1904. Serial No. 236,699.

*To all whom it may concern:*

Be it known that I, BENJAMIN HOLT, a citizen of the United States, residing at Stockton, in the county of San Joaquin and State of California, have invented a new and useful Wheel, of which the following is a specification.

My invention relates more particularly to that class of wheels used on heavy vehicles which receive a severe strain by reason of rough roads and hard usage, wherein a metallic tire is shrunken on fellies or rims arranged so as to strengthen and sustain said tire in shape; and my objects are to provide a wheel which, while cheap of construction, will be strong, durable, and efficient, one which may be easily adjusted and repaired, the principal object being to secure the tires and fellies or rims rigidly together. I attain these objects by the use of the peculiar construction, novel combination, and adaptation of parts hereinafter described, and pointed out in the claims, reference being had to the accompanying drawings, in which—

Figure 1 is a side elevation of my improved wheel. Fig. 2 is a sectional view of the same through line X X, Fig. 1. Fig. 3 is a detail view of one of the clamping-plates. Fig. 4 is a plan view of the same. Fig. 5 is a detached sectional view of a modification of my invention. Fig. 6 is a detail view of the block 15.

Similar figures of reference indicate corresponding parts throughout all the views.

It is a well-known fact that heretofore tires of the wheels of heavy vehicles—such as traction-engines, heavy freight-wagons, &c.—when used on rough and rocky roads will stretch and loosen from the rim or felly and other members of the wheel to such an extent as to render them unserviceable. I obviate this trouble by arranging the rims or fellies 1 of my wheel in pairs, as shown in Fig. 2, with a series of clamping-plates 2, each of which has the perforation 3 (shown in Fig. 4) arranged at intervals on the inner face of each pair of rims, with bolts 4 inserted in holes 5 in the tire 6 and extending through the perforations 3 in the plates 2. The nuts 7 are adapted to be placed on the bolts 4 and impinge upon the plates 2, thus securely maintaining the rims 1 rigidly in contact with the tire 6.

To prevent the rims 1 from slipping away from the plates 2, the two ends are formed into lips or hooks 8, which, with the bolts 4 passing between them, keep the rims in position.

The arrangement or location of the rims 1 on the tire 6 may be varied; but I preferably arrange them as shown in Fig. 2.

My invention may be applied to wheels where the rims are used singly instead of in pairs, as shown in Fig. 5, by using the block 15, as shown in Fig. 6, and only one end of the plate 2. The block 15 has a hole 16 to receive the bolt 4 and is of a height equal to the rim and is adapted to support the inner end of the plate 2, causing the free end to impinge upon the rim 1.

One feature of my invention is the facility with which the wheel may be repaired when the parts become loose while at a distance from a repair-shop. In such cases the only tool necessary is a wrench to fit the nuts 7 and a workman of ordinary skill. The spokes 9 of my wheel are inserted in perforations in the tire 6 and arranged alternately from side to side, so as to form an X, each alternate spoke being attached to near one side of the tire 6 and to the opposite end of the hub, which is formed with two disks 11, attached to a barrel 12, said disks 11 having the holes 13 in their periphery. By means of the nuts 14 the tire 6 may be adjusted and the whole structure kept tight.

Having thus described my invention, what I claim as new, and desire to secure by Letters Patent, is—

1. In a wheel of the class described the combination with a suitable hub, spokes, fellies, and tire, of the rim or felly arranged on the inner surface of said tire and clamped into position by the plates 2 and bolts 4, and the blocks 15, having the hole 16, arranged beneath one end of the plates 2 all arranged and operating substantially as shown and described.

2. In a wheel of the class described the combination with a suitable hub, spokes, fellies, and tire, of the plates 2 having the lip 8, arranged one end on the felly and the other end resting on the blocks 15, the said blocks 15 having the hole 16, and the bolt 4, inserted in the hole 16 and having the nut 7 adapted to impinge upon the plate 2 all arranged substantially as shown and described.

In testimony whereof I have hereunto affixed my signature to this specification in the presence of two subscribing witnesses.

BENJAMIN HOLT.

Witnesses:
P. E. HOLT,
M. HAYNES.